United States Patent [19]

Kasai

[11] Patent Number: 5,130,634
[45] Date of Patent: Jul. 14, 1992

[54] BATTERY CHARGER FOR A PORTABLE WIRELESS TELEPHONE SET HAVING MEANS FOR TRICKLINGLY CHARGING THE BATTERY WITH AN INCREASED CURRENT DURING A STAND-BY PERIOD OF THE TELEPHONE SET

[75] Inventor: Yoshihiko Kasai, Tokyo, Japan
[73] Assignee: NEC Corporation, Tokyo, Japan
[21] Appl. No.: 548,538
[22] Filed: Jul. 5, 1990
[30] Foreign Application Priority Data
 Jul. 5, 1989 [JP] Japan .................................. 1-171988
[51] Int. Cl.$^5$ .................................................. H02J 7/04
[52] U.S. Cl. ...................................... 320/22; 320/24; 320/39
[58] Field of Search ...................... 320/22, 23, 24, 39

[56] References Cited
U.S. PATENT DOCUMENTS

| | | | |
|---|---|---|---|
| 3,602,794 | 8/1971 | Westhaver | 320/22 X |
| 3,854,082 | 12/1974 | Nasby et al. | 320/22 |
| 4,670,703 | 6/1987 | Williams | 320/22 |

*Primary Examiner*—R. J. Hickey
*Attorney, Agent, or Firm*—Sughrue, Mion, Zinn Macpeak & Seas

[57] ABSTRACT

A battery charger for a portable wireless telephone set comprising a rapidly charging circuit for rapidly charging the battery by a first charging current of a high level at a start of the charging operation, a tricklingly charging circuit for tricklingly charging the battery by a second charging current of a considerably low level, and a charge controller for making the tricklingly charging circuit take over the rapidly charging circuit after a charge detecting circuit detects that the battery is rapidly charged to its normal voltage. In order to avoid that the battery is insufficiently charged by the tricklingly charging circuit when the telephone set is left in a power-on condition, the battery charger further comprises another charging circuit for supplying a third charging current which is lower thn the first charging current but higher than the second charging current. When the telephone set is in the power-on condition, the charge controller operates not the tricklingly charging circuit but the other charging circuit after the battery is rapidly charged to its normal voltage, so that the battery can be charged to the normal voltage even if the telephone set is left in the power-on condition.

6 Claims, 4 Drawing Sheets

BATTERY CHARGER FOR A PORTABLE WIRELESS TELEPHONE SET HAVING MEANS FOR TRICKLINGLY CHARGING THE BATTERY WITH AN INCREASED CURRENT DURING A STAND-BY PERIOD OF THE TELEPHONE SET

BACKGROUND OF THE INVENTION

1. Field of the Invention

The present invention relates to a battery charger for a portable wireless telephone set and, in particular, to such a battery charger having a function for tricklingly charging the battery after the battery is charged to its normal voltage.

2. Description of the Prior Art

A portable wireless telephone set has a battery with a normal voltage as a power source for a transmitter and a receiver of the telephone set. The battery energy is consumed when the telephone set is used for telephone communication. Therefore, it is necessary that the battery is charged when the telephone set is not used for the telephone communication.

To this end, a battery charger is usually provided for the portable wireless telephone set so as to charge the battery.

A known battery charger for use in a portable wireless telephone set comprises a rapidly charging circuit and a tricklingly charging circuit which are selectively operated under control of a charge controller.

At a start of the battery charge, the rapidly charging circuit generates a high level DC current for rapidly charging the battery. Once the battery is charged to the normal voltage, the rapidly charging circuit is stopped by the charge controller and the trickling charging circuit then generates a considerably low level current for tricklingly charging the battery.

The battery charger has a charge detecting circuit for detecting whether or not the battery is charged to the normal voltage. When the charge detecting circuit detects that the battery is charged to the normal voltage, the charge detecting circuit produces a detected signal which is delivered to the charge controller. Then, the charge controller stops the rapidly charging circuit and makes the tricklingly charging circuit operate to produce the low level DC current. Accordingly, the battery is tricklingly charged by the low level DC current.

When the battery is being charged, it is provided that a power swith of the telephone set should be turned off. Therefore, the trickling charging circuit is designed to produce such a low level DC current that the battery is not excessively charged.

On the other hand, when the power switch is turned on for a stand-by or a call waiting condition, the battery energy is also consumed but at a rate lower than a condition for the telephone communication. Therefore, when the power switch of the telephone set is left in an on condition, the battery is charged to the normal voltage by the rapidly charging circuit of the battery charger but the battery energy is consumed after the battery charging operation is turned from the rapidly charging circuit to the trickling charging circuit, so that the battery is insufficiently charged. This results into a fact that the next telephone communication is impossible or limited to a reduced communication time duration by use of the telephone set.

SUMMARY OF THE INVENTION

Accordingly, it is an object of the present invention to provide a battery charger for a portable wireless telephone set having a battery with a normal voltage which enables to maintain the normal voltage of the battery without any excessive charge after rapidly charging the battery to the normal voltage even when a power switch of the telephone set is left in an on condition.

According to the present invention, a battery charger for a portable wireless telephone set having a battery with a normal voltage as an electric power source for the telephone set is obtained which comprises an output port to be connected to the battery for delivering a charging current to the battery; DC power source for generating a DC power; first charging means coupled to the DC power source and the output port responsive to a first control signal for generating from the DC power a first DC current with a first level sufficient to rapidly charge the battery, the first DC current being delivered to the output port as the charging current; second charging means coupled to the DC power source and the output port responsive to a second control signal for generating from the DC power a second DC current with a second level considerably lower than the first DC current to tricklingly charge the battery, the second DC current being delivered to the output port as the charging current; third charging means couped to the DC power source and the output port responsive to a third control signal for generating from the DC power a third DC current with a third level lower than the first DC current but relatively higher than the second DC current, the third DC current being delivered to the output port as the charging current; charge detecting means coupled to the output port for detecting a voltage charged in the battery connected to the output port to produce, as a fourth control signal, a detected signal when the charged voltage reaches the normal battery voltage; and charge controlling means coupled to the charge detecting means for generating the first control signal when the fourth control signal is absent from the charge detecting means, the charge controlling means generating the third control signal in place of the first control signal in response to the fourth control signal when receiving a fifth control signal, the charge controlling means generating the second control signal in place of the first control signal in response to the fourth control signal when receiving none of the fifth control signal.

In an aspect of the present invention, the portable wireless telephone set has means for generating a power-on signal when the telephone set is powered on. The battery charger further comprises an input terminal to be coupled with the power-on signal generating means, the input terminal connected to the charge controlling means for delivering the power-on signal to the charge controlling means as the fifth control signal.

When the battery has a capacity C, the second level of the second DC current is determined to be a value of C/25 to C/15.

The battery supplies a stand-by current during a stand-by condition of the telephone set when the telephone set is powered on. Then, the third level of the third DC current is determined to be a sum of the value of the second level and a level of the stand-by current.

DESCRIPTION OF PREFERRED EMBODIMENTS

Prior to description of embodiments of the present invention, a known battery charger for a portable wireless telephone set will be described so as to help the better understanding of the present invention.

Figure 1:
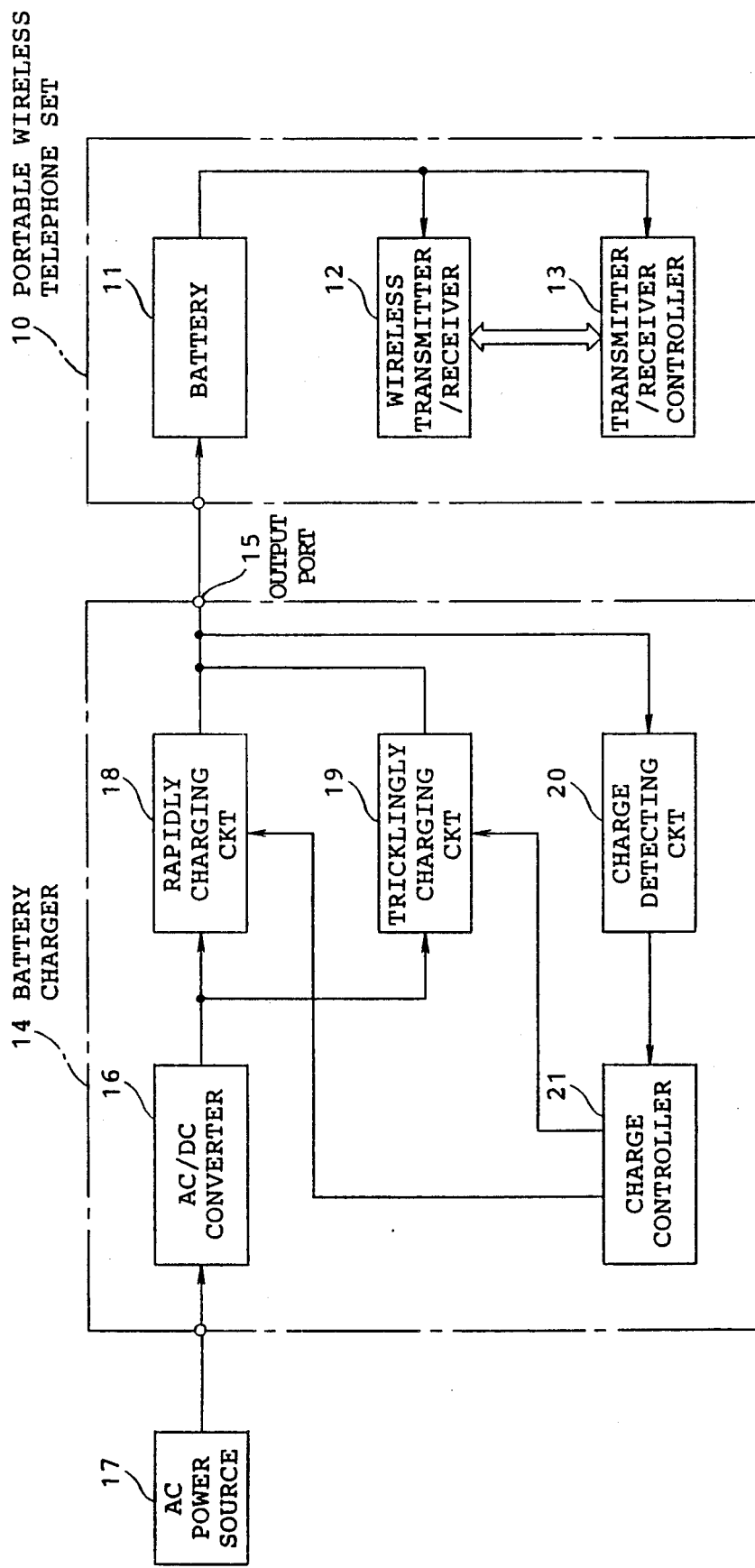
FIG. 1 is a view illustrating a block diagram of a known battery charger together with a portable wireless telephone set.

Referring to FIG. 1, a portable wireless telephone set 10 comprises a battery or a chargeable electric cell 11 such as a Ni-Cd cell, a wireless transmitter/receiver 12 and a transmitter/receiver controller 13. The battery 11 is a power source for the transmitter/receiver 12 and the transmitter/receiver controller 13 and has a normal voltage sufficient to drive them.

In order to charge the battery 11 so as to compensate consumption fo the battery energy, the telephone set 10 is provided with a battery charger 14 which is connectable to the telephone set 10.

The battery charger 14 comprises an output port 15 to be connected to the battery 11 for delivering a charging current to the battery 11, and a DC power source for providing the charging current.

In the shown embodiment, the DC power source is an AC/DC converter 16 which is connected to an AC power source 17. The AC/DC converter 16 converts an AC power from the AC power source 17 to a DC power with a DC voltage as a converted DC power.

The battery charger 14 further comprises a rapidly charging circuit 18, a tricklingly charging circuit 19, charge detecting circuit 20, and a charge controller 21.

The rapidly charging circuit 18 is connected to the AC/DC converter 16 and the output port 15 and produces a first DC current from the converted DC power when receiving a first control signal from the charge controller 21. The first DC current is delivered to the output port 15 as the charging current and has a first DC level which is sufficient to rapidly charge the battery 11.

The tricklingly charging circuit 19 is also connected to the AC/DC converter 16 and the output port 15 and produces a second DC current from the converted DC power when receiving a second control signal from the charge controller 21. The second DC current is delivered to the output port 15 as the charging current and has a second DC level which is considerably low to tricklingly charge the battery 11 after the battery 11 is charged to the normal voltage.

The charge detecting circuit 20 is connected to the output port 15 and detects a charged voltage of the battery 11 connected to the output port 15. When the charge detecting circuit 20 detects that the battery 11 is charged to the normal voltage, the charge detecting circuit 20 produces a detected signal.

The charge controller 21 is coupled to the charge detecting circuit 20 and produces the first control signal when the charge detecting circuit 20 does not produce the detected signal. Therefore, the battery 11 is supplied with the first DC current as the charging current and is rapidly charged to the normal voltage.

When the charge detecting circuit 20 produces the detected signal, the charge controller 21 receives the detected signal and stops the first control signal but produces the second control signal. Accordingly, the rapidly charging circuit 18 is stopped but the tricklingly charging circuit 19 is driven in response to the second control signal. Thus, the battery 11 is supplied with the second DC current as the charging current through the output port 15 and is tricklingly charged.

The tricklingly charging circuit 19 is usually designed that the second DC current has a current level of a value determined by C/15 through C/25, where C is a capacity of the battery 11. When C=1000 mAh, the second DC current is 50 mA.

When a power switch (not shown) of the telephone set 10 is turned on and the portable wireless telephone set 10 is in a stand-by or a waiting condition for a telephone call, the battery energy is also consumed. In known portable wireless telephone sets, the battery 11 usually supplies a stand-by current of about 50-100 mA to the wireless transmitter/receiver 12 and the transmitter/receiver controller 13.

Therefore, when the power swith is left on, the battery 11 is insufficiently charged as described in the preamble of the present description.

Figure 2:
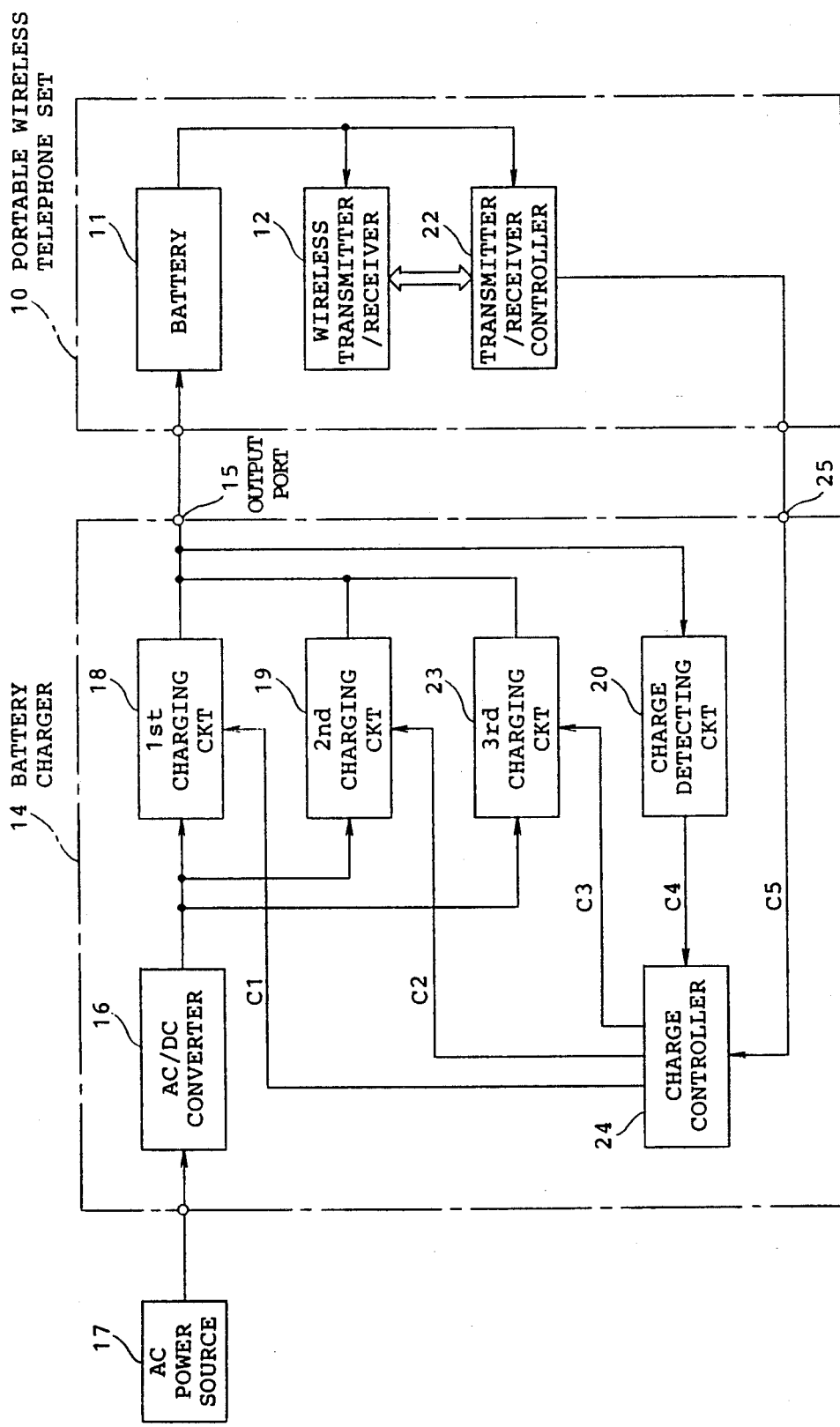
FIG. 2 is a view illustrating a block diagram of a battery charger according to an embodiment of the present invention together with a portable wireless telephone set.

Referring to FIG. 2, an embodiment of the present invention shown therein is similar to the known one shown in FIG. 1 except several differences. The similar parts are represented by the same reference numerals as in FIG. 1.

In the portable wireless telephone set 10, a transmitter/receiver controller 22 is different from the transmitter/receiver controller 13 in FIG. 1 in a fact that the transmitter/receiver 22 produces a power-on signal c5 when the power switch of the telephone set 10 is left on. The power-on signal is supplied to the battery charger 14.

The battery charger 14 comprises an output port 15, an AC/DC converter 16 connected to an AC power source 17, and a charge detecting circuit 20 which are similar to those shown at the same reference numerals in FIG. 1.

The battery charger 14 further comprises a first charging circuit 18, a second charging circuit 19, a third charging circuit 23, and a charge controller 24. The first charging circuit is corresponding to the rapidly charging circuit 18 in FIG. 1 and is represented by the same reference numeral 18. The second charging circuit 19 is also corresponding to the tricklingly charging circuit 19 in FIG. 1 and is, therefore, represented by the same reference numeral 19.

The third charging circuit 23 is coupled to the AC/DC converter 16 and the output port 15 and generates a third DC current from the converted DC power from the AC/DC converter 16 when receiving a third control signal. The third charging circuit 23 is designed that the third DC current has a level lower than the first DC current but relatively higher than the second DC current. The third DC current is also supplied to the battery 11 as the charging current through the output port 15.

When the second DC current is determined at C/20, for example, 50 mA for c=1,000 mAh, the third DC current is determined (C/20 +α), for example, (50+ζ) mA for C+1,000 mAh, where α represents the stand-by current which is consumed by the telephone set in the stand-by condition and is exemplarily 70 mA.

The battery charger 14 further comprises an input terminal 25 to be connected to the transmitter/receiver controller 22 for receiving the power-on signal.

The charge controller 24 is coupled to the charge detecting circuit 20 and the input terminal 25 and controls the first, the second and the third charging circuits 18, 19 and 23.

The charge controller 24 selectively produces the first, the second, and the third control signals c1, c2, and c3 in dependent on presence and absence of the detected signal as a fourth control signal c4 from the charge detecting circuit 20 and the power-on signal as a fifth control signal c5 through the input terminal 25.

Figure 3:
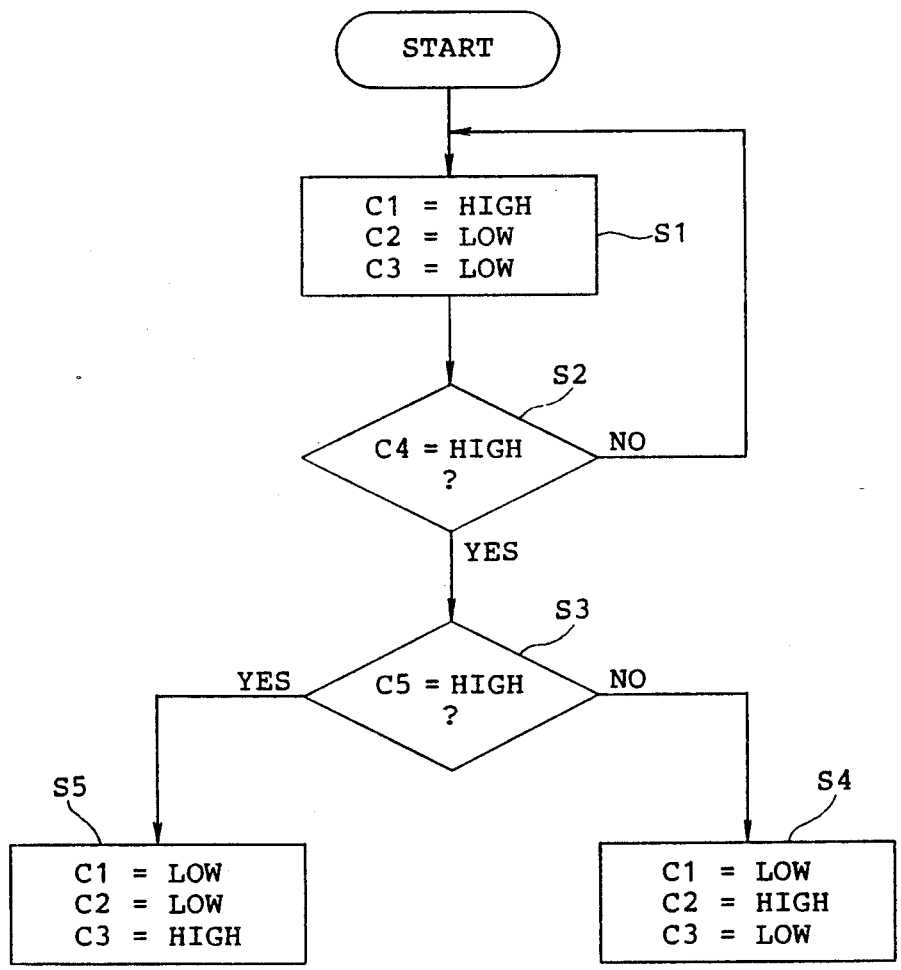
FIG. 3 is a flow chart illustrating operation of a charge controller in FIG. 2.

Referring to FIG. 3, the charge controller 24 produces the first control signal c1 of a high level signal and sets the second and the third control signals c2 and c3 at a low level at a start of charging operation, as shown at a step S1. Therefore, the first charging circuit 18 produces the first DC current and the battery 11 is rapidly charge by the first DC current.

Thereafter, when the charge detecting circuit 20 detects that the battery 11 is charge to its normal voltage, the charge detecting circuit 20 detects the detected signal as the fourth control signal c4 of a high level signal. When the charge controller 24 receives the fourth control signal c4 as shown at a step s2, the charge controller 24 changes the first control signal c1 to a low level signal and produces the second control signal c2 of a high level at a step of s4 when the fifth control signal c5 of a high level is not supplied to the charge controller 24 as shown at a step s3. Thus, the second charging circuit 19 operates and the battery 11 is tricklingly charged.

While, when the control signal c5 of a high level is supplied to the charge controller 24 at the step S3, the charge controller 24 changes the first control signal c1 to a low level signal and produces the third control c3 signal of a high level at a step S5. Therefore, the third charging circuit 23 operates to produce the third DC current. Thus, the battery is sufficiently charged when the power switch of the telephone set 10 is turned on.

Figure 4:
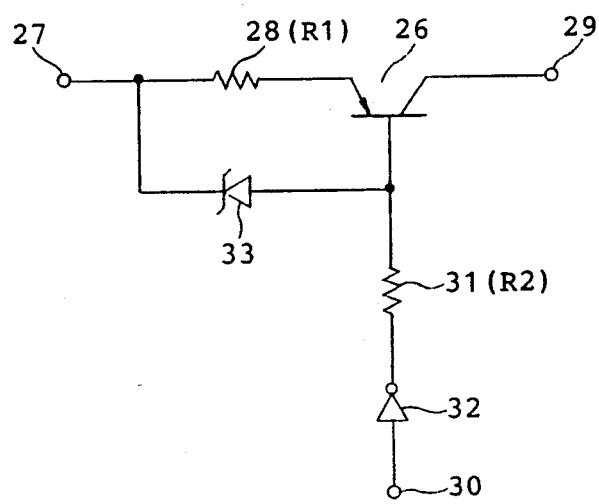
FIG. 4 is a circuit diagram view of a charging circuit used for the first through third charging circuits in FIG. 2.

Now, referring to FIG. 4, an example of a circuit is described which is used for each of the first, the second, and third charging circuits 18, 19, and 23.

The circuit shown therein comprises a PNP transistor 26. An emitter of the transistor 26 is connected to an input terminal 27 through a resistor 28 of a resistance of R1. A collector of the transistor 26 is connected to an output terminal 29. A base of the transistor 26 is connected to a control terminal 30 through a base resistor 31 of a resistance of R2 and an inverter circuit 32. A Zener diode 33 is connected between the base and the emitter. When a DC power is supplied to the input terminal 27 and a high level signal is applied to the control terminal 30, the circuit produces a constant DC current at the output terminal 29. A value or level of the constant DC current is adjusted by selecting the resistance R1 of the resistor 28. When the resistance R1 is selected small, the constant DC current has a high level.

On the other hand, when the resistance R1 is selected large, the constant DC current has a low level.

When a low level signal is applied to the control terminal 30, the circuit is stopped to produce the DC current.

Therefore, the circuit of FIG. 4 can be used for each of the first, the second, and the third charging circuits 18, 19, and 23 selecting the resistance R1 of the resistor 28.

Figure 5:
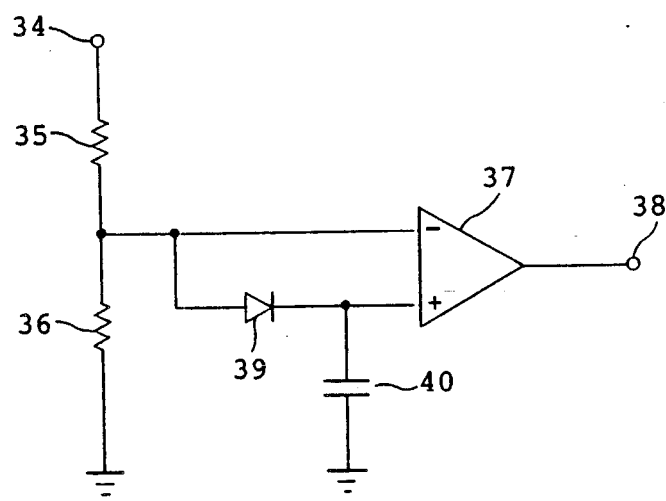
FIG. 5 is a circuit diagram view of a charge detecting circuit in FIG. 2.

Referring to FIG. 5, an example of the charge detecting circuit 20 will now be described. The circuit shown therein comprises an input terminal 34 which is to be connected to the output port 15 in FIG. 2, a voltage divider of resistors 35 and 36, and a comparator 37 having an inverting input terminal (−), a non-inverting input terminal (+), and an output terminal 38. The inverting input terminal (−) is connected to a common connecting point of the resistors 35 and 36 and is supplied with a voltage divided by the divider. The common connection point is also connected to the non-inverting input terminal (+) through a diode 39. The non-inverting input terminal (+) is grounded through a capacitor 40. Therefore, the divided voltage is applied across a series circuit of the diode 39 and the capacitor 40.

During the charging operation for the battery 11 in FIG. 2, the peak charged voltage of the battery 11 is divided by the voltage divider (35-36) and then held at the capacitor 40 through the diode. The held voltage is applied to the non-inverting input terminal (+) of the comparator 37 as a reference voltage level. Just after the battery 11 is fully charged, the charged voltage drops by some extent. As a result, the divided voltage at the inverting input terminal (−) falls below the reference voltage at the non-inverting input terminal (+), so that a high level signal is produced at the output terminal 38 as the detected signal. Thus, the detected signal indicates that the battery 11 is fully charged. The detected signal is applied to the charge controller 24 as the fourth signal c4.

What is claimed is:

1. A battery charger for a portable wireless telephone set including a battery having a normal battery voltage as an electric power source for the telephone set, the portable wireless telephone set having means for generating a power-on signal when the telephone set is powered on, which comprises:

an output port to be connected to said battery for delivering a charging current to said battery;

DC power source for generating a DC power;

first charging means coupled to said DC power source and said output port responsive to a first control signal for generating from said DC power a first DC current with a first level sufficient to rapidly charge said battery, said first DC current being delivered to said output port as said charging current;

second charging means coupled to said DC power source and said output port responsive to a second control signal for generating from said DC power a second DC current with a second level considerably lower than said first DC current to tricklingly charge said battery, said second DC current being delivered to said output port as said charging current;

third charging means coupled to said DC power source and said output port responsive to a third control signal for generating from said DC power a third DC current with a third level lower than said first DC current but relatively higher than said second DC current, said third DC current being delivered to said output port as said charging current;

charge detecting means coupled to said output port for detecting a voltage charged in said battery connected to said output port to produce, as a fourth control signal, a detected signal when said charge voltage reaches said normal battery voltage;

an input terminal to be coupled with said power-on signal generating means and responsive to said power-on signal for producing a fifth control signal; and charge controlling means coupled to said charge detecting means and said input terminal means for generating said first control signal when said fourth control signal is absent from said charge detecting means, said charge controlling means generating said third control signal in place of said first control signal in response to said fourth control signal when receiving said fifth control signal, said charge controlling means generating said second control signal in place of said first control signal in response to said fourth control signal when said fifth control signal is absent.

2. A battery charger as claimed in claim 1, the battery having a capacity C, wherein said second level of said second DC current is determined to be a value of C/25 to C/15.

3. A battery charger as claimed in claim 2, the battery supplying a stand-by current during a stand-by condition of the telephone set when said telephone set is powered on, wherein said third level of the third DC current is determined to be a sum of the value of the second level and a level of said stand-by current.

4. An apparatus comprising:
 first charging means for charging a battery at a first charging current, said battery supplying power to a communication device;
 second charging means for charging said battery at a second charging current lower than said first charging current;
 third charging means for charging said battery at a third charging current lower than said second charging current;
 AC/DC converter means for converting an AC voltage into a DC voltage and supplying said DC voltage to said first, second, and third charging means;
 first detecting means for detecting the fully charged condition of said battery to produce a full charge detect signal;
 second detecting means for detecting the ON/OFF condition of said communication device to produce an on-state signal when said device is turned on and an off-state signal when said device is turned off; and
 control means for making said first charging means operative in the absence of said full charge detect signal, for making said first and second charging means inoperative and said third charging means operative in the presence of said full charge detect signal and of said off-state signal, and for making said first and third charging means inoperative and said second charging means operative in the presence of said full charge detect signal and of said on-state signal;
 each of said first, second, and third charging means comprising:
 a first resistor whose one end is coupled to said AC/DC converter means;
 a PNP transistor whose emitter and collector are connected to the other end of said first resistor and said battery, respectively;
 a Zener diode whose anode and cathode are connected to the base of said transistor and said one end of said first resistor, respectively;
 a second resistor whose one end is connected to said base; and
 and inverter whose output and input terminals are connected to the other end of said second resistor and said control means, respectively.

5. An apparatus as claimed in claim 4, wherein said communication device comprises a portable wireless telephone set.

6. An apparatus as claimed in claim 4, wherein said second detecting means comprises:
 first and second resistors connected in series between said battery and ground;
 a comparator whose inverting input and output terminals are connected to the junction of said first and second resistors and said control means, respectively;
 a diode whose anode and cathode are connected to the inverting and non-inverting input terminals of said comparator, respectively; and
 a capacitor connected between said non-inverting input terminal and ground.

* * * * *